United States Patent
Tsirkin et al.

(10) Patent No.: US 10,223,215 B2
(45) Date of Patent: *Mar. 5, 2019

(54) DRIVER SWITCH FOR DEVICE ERROR RECOVERY FOR ASSIGNED DEVICES

(71) Applicant: Red Hat Israel, Ltd., Ra'anana (IL)

(72) Inventors: Michael Tsirkin, Lexington, MA (US); Amnon Ilan, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,879

(22) Filed: Oct. 9, 2017

(65) Prior Publication Data
US 2018/0232288 A1 Aug. 16, 2018

Related U.S. Application Data

(63) Continuation of application No. 15/434,269, filed on Feb. 16, 2017, now Pat. No. 9,785,519.

(51) Int. Cl.
| | |
|---|---|
| G06F 9/455 | (2018.01) |
| G06F 11/16 | (2006.01) |
| G06F 11/14 | (2006.01) |

(52) U.S. Cl.
CPC ...... *G06F 11/1637* (2013.01); *G06F 9/45558* (2013.01); *G06F 11/1415* (2013.01); *G06F 11/1458* (2013.01); *G06F 2009/45579* (2013.01); *G06F 2009/45591* (2013.01); *G06F 2201/815* (2013.01)

(58) Field of Classification Search
None
See application file for complete search history.

(56) References Cited

U.S. PATENT DOCUMENTS 7,155,590 B2 * 12/2006 Mathis ............... G06F 21/51
                                                                                711/164
8,892,962 B2    11/2014 Iwanaga et al.
8,954,963 B2     2/2015 Hattori et al.
(Continued)

OTHER PUBLICATIONS

Chapter 9. Guest Virtual Machine Device Configuration, Copyright 2016 Red Hat, Inc.; 29 pages Link: https://access.redhat.com/documentation/en-US/Red_Hat_Enterprise_Linux/6/html/Virtualization_Administration_Guide/chap-Guest_virtual_machine_device_configuration.html.
(Continued)

*Primary Examiner* — Dong U Kim
(74) *Attorney, Agent, or Firm* — K&L Gates LLP

(57) ABSTRACT

An error recovery system includes a memory, a processor in communication with the memory, a primary device, a backup device, a hypervisor executing on the processor, and a virtual machine. The virtual machine includes a guest operating system (OS) executing on the hypervisor, a pass-through device, and a guest driver. The hypervisor executes to detect an error associated with the primary device and to send a request to save a device state to the guest driver. The hypervisor also grants the guest OS access to the backup device. The guest driver receives the request from the hypervisor, and responsive to receiving the request, saves a state signature in the memory. The state signature includes a device signature and the device state of the primary device. Additionally, the guest driver determines a status of the device signature as one of matching and mismatching the backup device.

20 Claims, 4 Drawing Sheets

(56) References Cited

U.S. PATENT DOCUMENTS

| | | |
|---|---|---|
| 9,336,036 B2 | 5/2016 | Dong et al. |
| 9,430,266 B2 | 8/2016 | Takeuchi |
| 2007/0180290 A1* | 8/2007 | Stevenson ........... G06F 11/1469 |
| | | 714/5.1 |
| 2014/0359613 A1 | 12/2014 | Tsirkin |
| 2016/0179635 A1 | 6/2016 | Kondalsamy et al. |
| 2016/0239323 A1 | 8/2016 | Tsirkin et al. |

OTHER PUBLICATIONS

Error codes in Device Manager in Windows, Copyright 2016 Microsoft; 20 pages Link: https://support.microsoft.com/en-in/kb/310123.

I/O Device Error, Copyright 2016 iCare Recovery; 3 pages Link: http://www.icare-recovery.com/howto/io-device-error.html.

\* cited by examiner

DRIVER SWITCH FOR DEVICE ERROR RECOVERY FOR ASSIGNED DEVICES

CROSS REFERENCES TO RELATED APPLICATIONS

This application is a continuation of and claims priority to and the benefit of U.S. patent application Ser. No. 15/434,269, filed on Feb. 16, 2017, the entire content of which is hereby incorporated by reference.

BACKGROUND

Computer systems may employ virtual machines including one or more guest operating systems (OS). A virtual machine (VM) is a software implementation of a computer that executes programs in a way similar to a physical machine. The virtual machine may share underlying physical hardware resources between different virtual machines. Each virtual machine may be associated with a physical device, such as a hardware device. A virtual machine may include a virtual device that serves as a pass-through device to the physical device, and the virtual machine may perform tasks associated with the functions of the physical device and/or related to the associated physical device. Additionally, multiple physical devices may be included for redundancy within the underlying physical hardware in case one of the physical devices associated with the virtual machine fails.

SUMMARY

The present disclosure provides new and innovative systems and methods of device error recovery for an assigned device. In an example, a system includes a memory, one or more physical processors in communication with the memory, a primary device, a backup device, a hypervisor executing on the one or more physical processors, and a virtual machine including a guest operating system (OS) executing on the hypervisor, a pass-through device, and a guest driver in the guest OS. The hypervisor executes on the one or more physical processors to detect an error associated with the primary device and send a request to save a device state to the guest driver. The device state is associated with the primary device. The hypervisor grants the guest OS access to the backup device. The guest driver in the guest OS executing on the hypervisor receives the request from the hypervisor, and responsive to receiving the request, saves a state signature in the memory. The state signature includes a device signature of the primary device and the device state of the primary device. Additionally, the guest driver determines a status of the device signature as either matching the backup device or mismatching the backup device.

In an example, a method includes detecting, by a hypervisor, an error associated with a primary device. The hypervisor sends a request to save a device state to a guest driver in a guest OS. The device state is associated with the primary device. The guest driver receives the request from the hypervisor. Responsive to receiving the request, the guest driver saves a state signature in a memory. The state signature includes a device signature of the primary device and a device state of the primary device. The hypervisor grants the guest OS access to a backup device, and the guest driver determines a status of the device signature as either matching the backup device or mismatching the backup device.

In an example, a non-machine readable medium storing a program, which when executed by a processor, causes a hypervisor to detect an error associated with a primary device, and send a request to save a device state to a guest driver in a guest OS. The device state is associated with the primary device. Responsive to receiving the request, the guest driver saves a state signature in a memory, and the state signature includes a device signature of the primary device and the device state of the primary device. The non-machine readable medium also causes the hypervisor to grant the guest OS access to a backup device. The guest driver determines a status of the device signature as either matching the backup device or mismatching the backup device.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing a driver switch for device error recovery for an assigned device. Assigned devices, such as hardware devices, have varying hardware, firmware, memory sizes, etc. Current techniques for switching to a backup device typically involve fully removing any primary devices from the guest OS and discarding the driver and/or state (e.g., device state and device signature). Then, the device state is recreated after the backup device is added to the virtual machine via the pass-through device. However, these techniques are generally expensive and result in additional downtime. For example, device profiles may need to be recreated after switching to the backup device before the system resumes operating as it was before the primary device failed. To reduce overhead and downtime, the device state may be stored in memory such that if the primary device fails and the backup device is used, the device state may be restored from memory in the backup device. However, devices may typically vary slightly by way of build versions, vendors, and/or updates. For example, in ten PCI cards, each PCI card may have slightly different hardware and firmware versions such that a saved device state on one device may not work well on another device for a specific host OS.

As discussed in the various example embodiments disclosed herein, to decrease downtime and improve efficiency of switching to backup devices after a primary device failure, a guest device driver may be used to detect a mismatch in the device state and enable the guest OS to recover (e.g., reinitialize the backup device) to ensure that the system functions properly. This may advantageously allow for efficient error recovery and prevent issues that may arise due to varying differences between devices. For example, loading the device state from memory without checking for a match may result in wasted resources in each case of a mismatch, as the device may need to be reinitialized for a successful error recovery. Specifically, in the case of a mismatching devices, the guest OS may crash when attempting to use a backup device that is different from the primary device. On the other hand, reinitializing every device after an error or failure consumes additional resources in each case of a match because the backup device state may have been loaded from memory resulting in a quicker and more efficient error recovery. Thus, the techniques described herein advantageously enable error recovery for both matched and mismatched devices while avoiding crashing the guest OS and the additional overhead associated with recreating a device state or reinitializing a device for each instance of error recovery.

Figure 1:
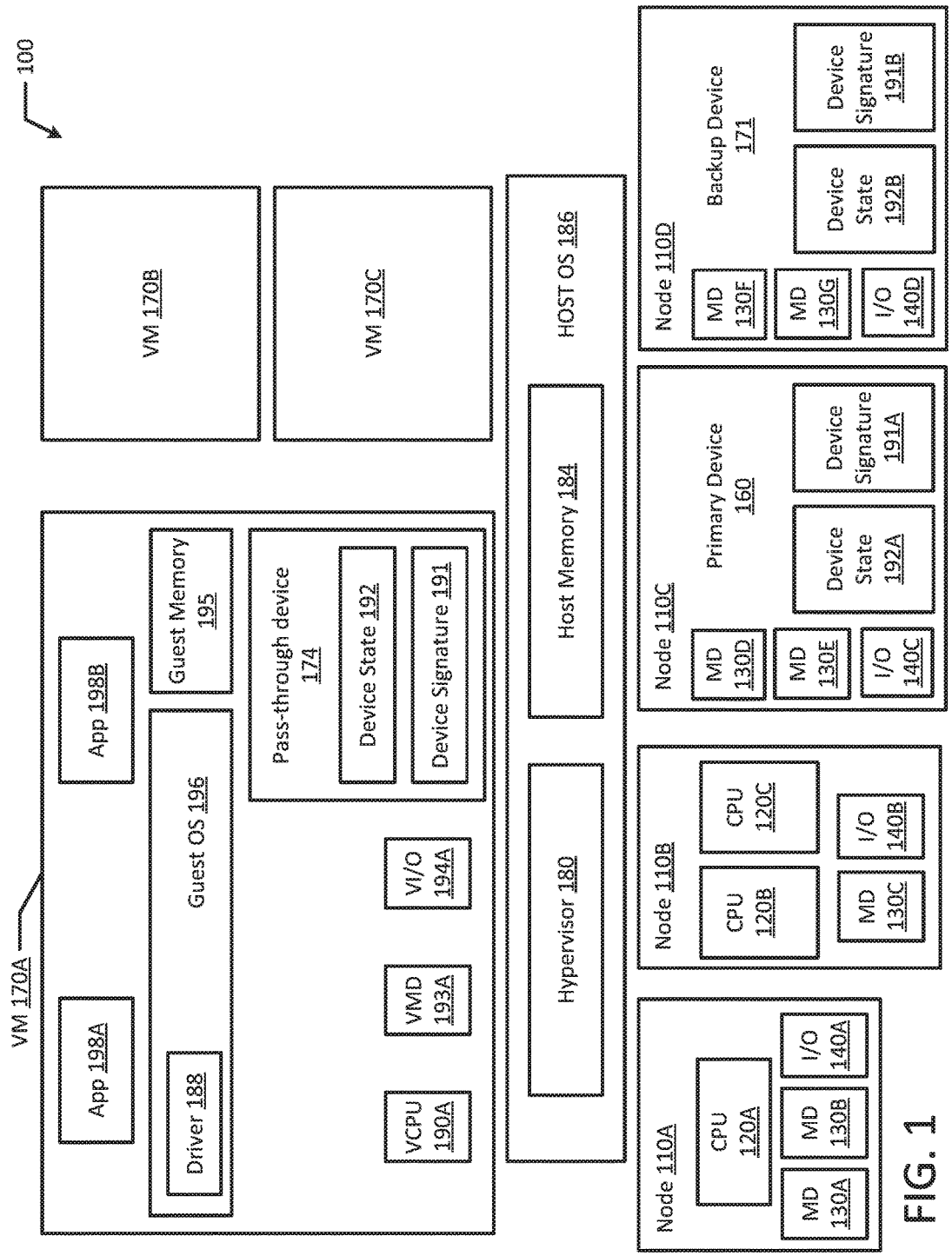
FIG. 1 illustrates a block diagram of an example computer system according to an example embodiment of the present disclosure.

FIG. 1 depicts a high-level component diagram of an example computer system 100 in accordance with one or more aspects of the present disclosure. The computer system 100 may include a memory (e.g., MD 130A-G), one or more physical processors in communication with the memory (e.g., CPU 120A-C), one or more virtual machines (e.g., VM 170A-C), and a hypervisor (e.g., hypervisor 180).

The virtual machines 170A-C may include a guest OS, guest memory, a virtual CPU (VCPU), virtual memory devices (VMD), and virtual input/output devices (VI/O). For example, virtual machine 170A may include guest OS 196, guest memory 195, a virtual CPU 190A, a virtual memory devices 193A, and virtual input/output device 194A. Guest memory 195 may include one or more memory pages. In an example embodiment, a first virtual machine (e.g., VM 170A) may include a pass-through device 174. For example, the pass-through device 174 may be virtualized or emulated by the hypervisor 180. The pass-through device 174 may be associated with a primary device 160. Additionally, the pass-through device 174 may be associated with a back-up device 171. For example, the pass-through device 174 may be switched from the primary device 160 to the backup device 171 after the primary device 160 fails. The pass-through device 174 may include a device state 192 and a device signature 191. For example, prior to a device failure, the pass-through device 174 may be associated with the primary device 160 such that device state 192 and device signature 191 are associated with the device state 192A and device signature 191A of the primary device 160. After failure, when the system 100 utilizes the backup device 171, the device state 192 and device signature 191 of the pass-through device 174 may be associated with device state 192B and device signature 191B.

As noted above, computer system 100 may run multiple virtual machines (e.g., VM 170A-C), by executing a software layer (e.g., hypervisor 180) above the hardware and below the virtual machines 170A-C, as schematically shown in FIG. 1. In an example, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-C as devices, including virtual processors (e.g., VCPU 190A), virtual memory devices (e.g., VMD 193A), and/or virtual I/O devices (e.g., VI/O 194A). It should be appreciated that VM 170B and VM 170C may include one or more VCPUs, VMDs, and/or VI/O devices.

In an example, a virtual machine 170A may execute a guest operating system 196 which may utilize the underlying VCPU 190A, VMD 193A, and VI/O device 194A. One or more applications 198A-B may be running on a virtual machine 170A on the respective guest OS 196. A virtual machine (e.g., VM 170A-C, as illustrated in FIG. 1) may run any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications run on another virtual machine 170B are incompatible with the underlying hardware and/or OS 186. In an example embodiment, a device may be implemented as a virtual machine (e.g., virtual machine 170A-C).

The hypervisor 180 may manage host memory 184 for the host operating system 186 as well as memory allocated to the virtual machines 170A-C and guest operating systems 196 such as guest memory 195 provided to guest OS 196. Host memory 184 and guest memory 195 may be divided into a plurality of memory pages that are managed by the hypervisor 180. Guest memory 195 allocated to the guest OS 196 may be mapped from host memory 184 such that when a guest application 198A-B uses or accesses a memory page of guest memory 195 it is actually using or accessing host memory 184.

The computer system 100, may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Nodes 110C-D may include a device such as a primary device 160 or a backup device 171. In an example, a primary device 160 and/or a backup device 171 may include a hardware device, such as a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The nodes 110C-D may include one ore more physical processors communicatively coupled to memory devices (e.g., MD 130D-G) and input/output devices (e.g., I/O 140C-D). Additionally, node 110C may be a primary device 160 with a device state 192A and a device signature 191A. Additionally, node 110D may be a backup device 171 with a device state 192B and a device signature 191B. For example, the backup device 171 may be included in the computer system 100 to provide redundancy as a backup to the primary device 160 in case the primary device 160 fails. In an example, computer system 100 may include multiple backup devices 171. For example, primary device 160 may include several redundancies on the system 100 in case of more than one device failure. Device states 192A-B and device signatures 191A-B may both be associated with the pass-through device 174 because the pass-through device 174 may be associated with either of the primary device 160 and the backup device 171.

As used herein, a physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-G refers to a volatile or non-volatile memory device, such as RAM, ROM, EEPROM, or any other device capable of storing data. As discussed herein, I/O device 140A-D refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node and/or between nodes, including the connections between a processor 120A-C and a memory device 130A-C and between a processor 120A-C and an I/O device 140A-B, may be provided by one or more local buses of suitable architecture, for example, peripheral component interconnect (PCI).

Figure 2:
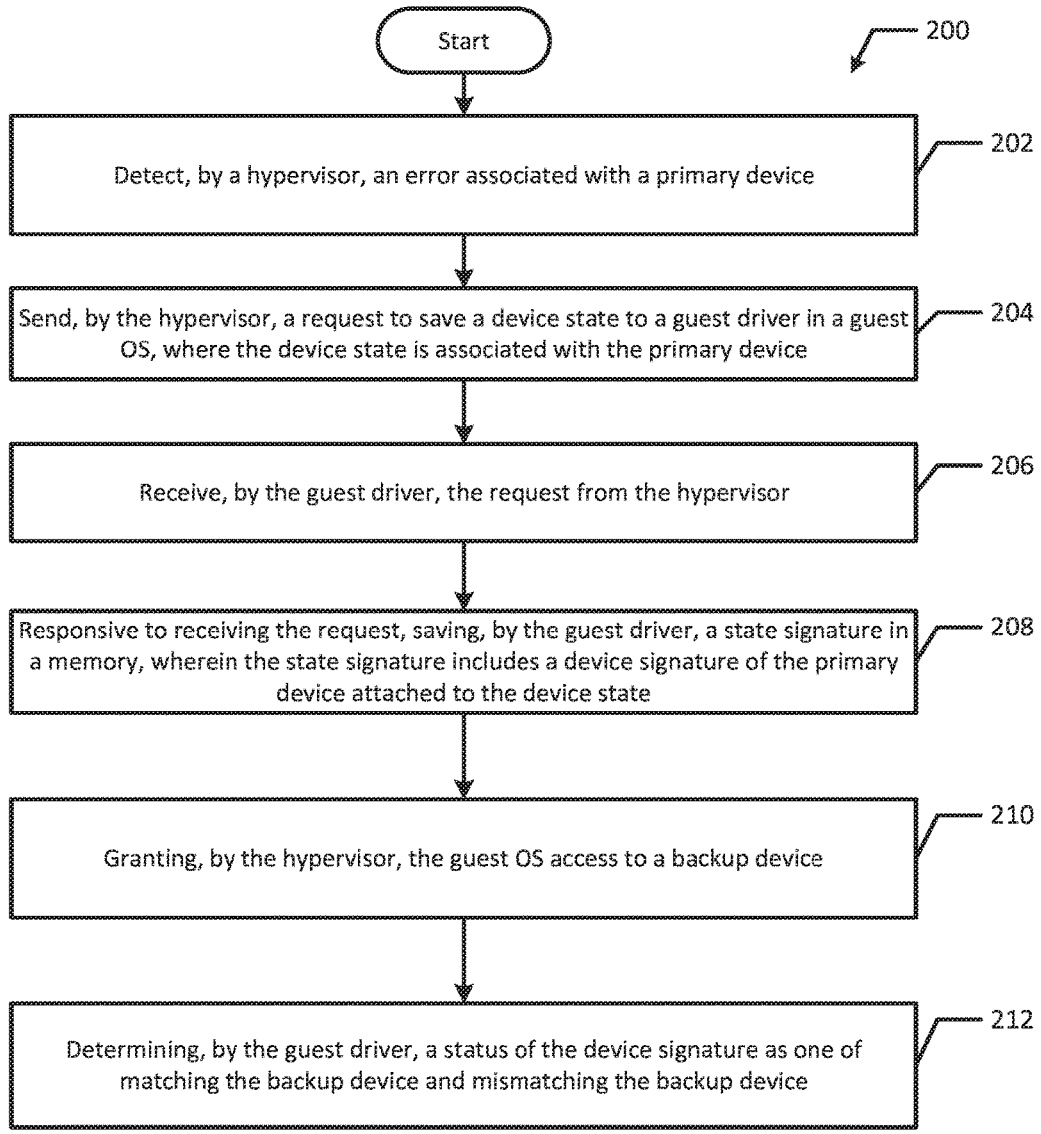
FIG. 2 illustrates a flowchart of an example process for device error recovery according to an example embodiment of the present disclosure.

FIG. 2 illustrates a flowchart of an example method 200 for device error recovery in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes a hypervisor detecting an error associated with a primary device (block 202). For example, a hypervisor 180 may detect an error associated with a primary device 160. In an example, the error may be associated with the primary device 160 failing or malfunctioning due to a hardware failure. Then, the hypervisor may send a request to save a device state to a guest driver in a guest OS (block 204). For example, the hypervisor 180 may send a request to save a device state 192 to a guest driver 188 in guest OS 196. In an example, the device state 192 may be associated with the primary device 160 (e.g., device state 192A associated with primary device 160). In an example, the device state 192A may be saved after a failure is detected. In another example, the device state 192A may be saved prior to failure, for example, when the primary device 160 is originally installed or initialized. Then, a guest driver may receive the request from the hypervisor (block 206). For example, the guest driver 188 may receive the request from the hypervisor 180. Additionally, the hypervisor 180 may send the guest OS 196 a message including instructions to save a device state 192 to a guest driver 188 in the guest OS 196. In another example, the request may be sent to the guest OS 196, which may then forward the request to the guest driver 188.

In an example, the request to save the device state 192A may be a message and/or instructions received by the guest OS 196. For example, the guest OS 196 may receive a request to save the device state 192 of the pass-through device 174 associated with the primary device 160. For example, when computer system 100 is using the primary device 100, the device state 192 of the pass-through device 174 may be the same as the device state 192A of the primary device. The guest OS 196 may save the device state 192 from the pass-through device or the device state 192A from the primary device 160. In another example, the guest OS 196 may receive a request and/or multiple requests to save device states for multiple pass-through devices (e.g., multiple pass-through devices in a virtual machine) associated with various primary devices 160 and/or backup devices 171.

Responsive to receiving the request, the guest driver saves a state signature in a memory (block 208). For example, responsive to receiving the request, the guest driver 188 may save a state signature in memory guest memory 195. The state signature may include information associated with the device's memory, storage, and network connectivity. In an example, the state signature of the primary device 160 may include a device signature 191A of the primary device 160 attached to the device state 192A of the primary device 160. The state signature and/or the device signature 191A of the primary device 160 may include a hardware device ID, a firmware device ID, a vendor ID and/or a version. Additionally, the state signature may include a hash function, a list of loaded firmware and/or a memory size of the primary device 160. Additionally, the device signature 191A may include a unique identifier such as a random number, a token, or a text string. For example, the device signature 191A may be 0x1e9704, may be a MAC Address, or the like. In an example, a device state 192 may include information about the device (e.g., primary device 160) such as the CPU state, registers, non-pageable memory used by the device, where the device is located, etc. Then, the hypervisor may grant the guest OS access to a backup device (block 210). For example, the hypervisor 180 may grant the guest OS 196 access to a backup device 171.

Then, the guest driver may determine a status of the device signature as one of matching the backup device and mismatching the backup device (block 212). For example, the guest driver 188 may determine a status of the device signature 191 as either matching the backup device 171 or mismatching the backup device 171. Specifically, the guest driver 188 may determine if device signature 191A of the primary device 160 matches the device signature 191B of the backup device 171. For example, the guest driver 188 may check the state signature of the backup device 171 against the state signature of the primary device 160 (e.g., device signature 191A and device state 192A). In an example, a pointer may be used to pass the state signature of the primary device 160 and/or backup device 171 to the guest driver 188. For example, the pointer may point to the location in memory of the saved state signature of the primary device 160. Additionally, the state signature of the backup device 171 may also be saved in memory. In an example, the guest driver 188 may notify the guest OS 196 of the status of the state signature as matching or mismatching.

Responsive to determining the status of the state signature as mismatching, the backup device 171 may be reinitialized such that the guest OS 196 may resume operation with a newly loaded device state 192B in pass-through device 174. The guest OS 196 may bind a new driver in the case of mismatching to ensure the proper guest driver is used with the backup device 171. For example, the guest OS 196 may unbind guest driver 188 from the pass-through device 174 and may bind a new driver to pass-through device 174 if a mismatch is determined. Additionally, the guest OS 196 may unload the guest driver 188 from memory (e.g., guest memory 195) and may load a new guest driver in the memory (e.g., guest memory 195). Conversely, responsive to determining the status of the state signature as matching, the hypervisor 180 may send a restore notification to the guest driver 188 to restore the state into the backup device 171.

Figure 3:
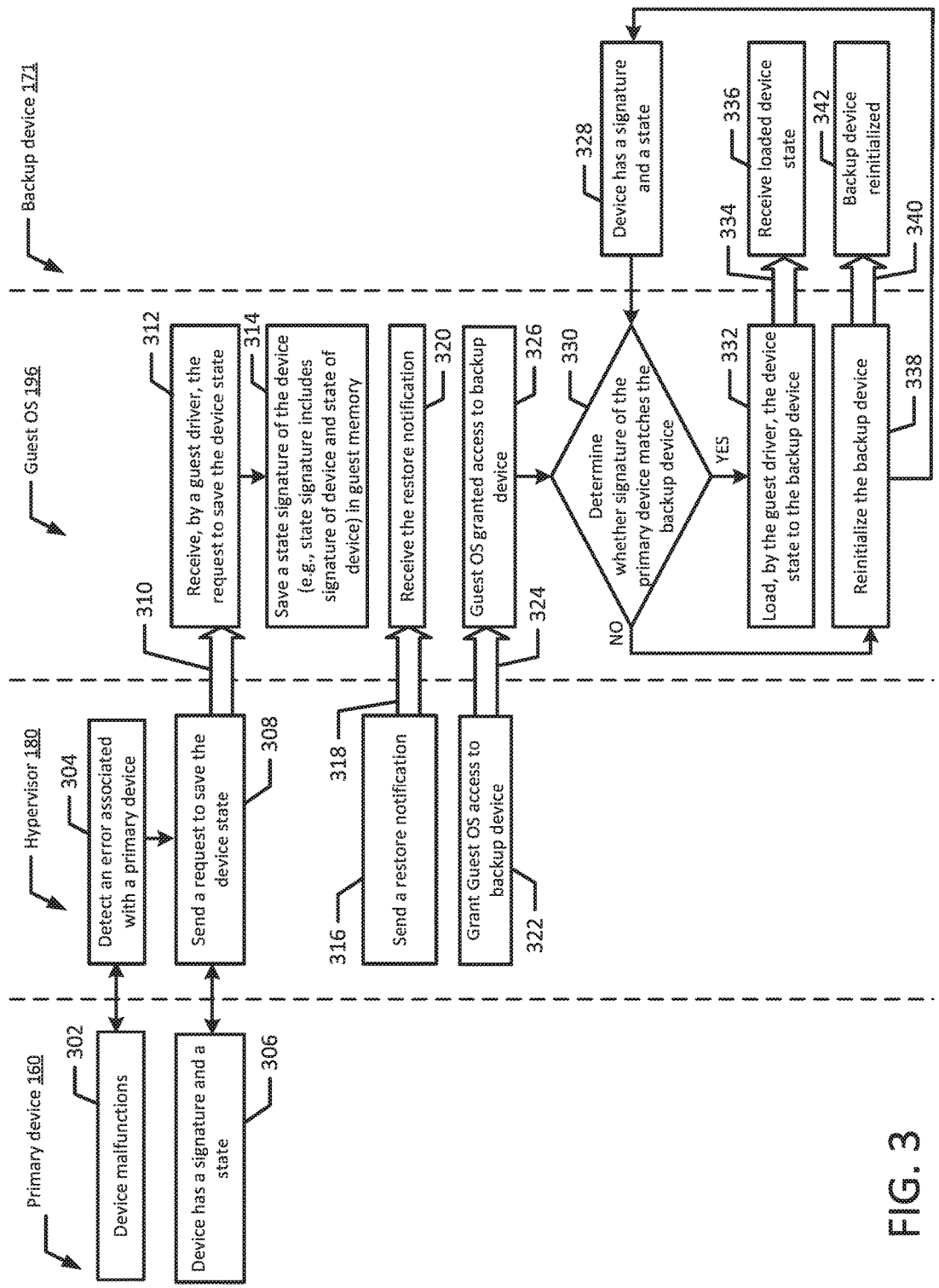
FIG. 3 illustrates a flow diagram of an example process for device error recovery according to an example embodiment of the present disclosure.

FIG. 3 illustrates a flowchart of an example method 300 for device error recovery in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. For example, guest OS 196, guest driver 188, hypervisor 180, primary device 160, and backup device 171 may communicate to perform example method 300.

In the illustrated example, a primary device 160 may malfunction (block 302). For example, the primary device 160 may fail due to a hardware malfunction. Then, a hypervisor 180 may detect an error associated with the primary device 160 (block 304). In an example, the error may be because the primary device 160 has failed or malfunctioned due to hardware failure. Additionally, there may be a communication break between the primary device 160 and the hypervisor 180. The primary device 160 may include a device signature 191A and a device state 192A (block 306). In an example, the device signature 191A may include a hardware device ID, a firmware device ID, a vendor ID and/or a version. Additionally, the device signature 191A may also include a hash function, a list of loaded firmware, memory size, etc. A device state 192A may include information about the device such as the CPU state, registers, non-pageable memory used by the device, where the device is located, etc. The hypervisor 180 may send a request to a guest OS 196 to save the device state 192A of the primary device 160 (blocks 308 and 310). The device state 192 of the pass-through device 174 may be associated with the primary device 160. For example, the pass-through device 174 may be a virtual device exposed to the guest OS 196 and may be associated with the primary device 160 on the host OS 186. In an example, the state signature may include a hash function, a list of loaded firmware and/or a memory size of the pass-through device 174 and/or the associated primary device 160. In an example, the hypervisor 180 may send the request directly to the guest driver 188. Then, the guest driver 188 may receive the request to save the device state 192 (block 312). In an example, the request may include instructions to perform additional operations after saving the device state 192 (e.g., device state 192A of the primary device 160).

Then, the guest driver 188 may save a state signature of the device in guest memory (block 314). In an example, the state signature includes the device signature 191 and the device state 192. Then, the hypervisor 180 may send a restore notification to the guest OS 196 (blocks 316 and 318). For example, the hypervisor 180 may notify the guest OS 196 to restore the device (e.g., primary device 160) after detecting an error or failure. Then, the guest OS 196 may receive the restore notification (block 320). In an example, the restore notification may include instructions to perform additional operations after device restoration. Additionally, the hypervisor 180 may grant the guest OS access to the backup device 171 (blocks 322 and 324). For example, the hypervisor 180 may provide the guest OS the location in memory of the backup device 171. Then, the guest OS is granted access to the backup device (block 326).

The backup device has a device signature 191B and a device state 192B (block 328). In an example embodiment, the device signature 191B of the backup device 171 may include a hardware device ID, a firmware device ID, a vendor ID and/or a version. In an example embodiment, the device signature 191B may include a unique identifier such as a random number, a token, or a text string. For example, the device signature 191B may be 0x1e9708, may be a MAC Address, or the like. The device signature 191B may also include a hash function, a list of loaded firmware, memory size, etc. A device state 192B may include information about the device such as the CPU state, registers, non-pageable memory used by the device, where the device is located, etc.

The guest OS may determine whether the signature of the primary device 160 matches the backup device 171 (block 330). For example, the guest OS 196 may check the state signature of the backup device 171 against the state signature of the primary device 160 (e.g., device signature 191A and device state 192A). In an example, a pointer may be used to pass the state signature of the primary device 160 and/or backup device 171 to the guest OS 160 or guest driver 188. For example, the pointer may point to the location in memory of the saved state signature of the primary device 160. Additionally, the state signature of the backup device 171 may also be saved in memory, such as guest memory 195.

If the signature of the primary device 160 matches the signature of the backup device 171, then the guest driver 188 may load the device state 192 (e.g., device state 192A of the primary device 160) to the backup device 171 (blocks 332 and 334). For example, the device state 192A may be loaded to the backup device 171 such that the backup device 171 has the same device state as the primary device 160 (e.g., device states 192A-B are the same). Additionally, the guest OS may execute on the hypervisor 180 to unbind the guest driver 188 from the pass-through device 174 and may bind a new guest driver to the pass-through device 174. Then, the backup device 171 may receive the loaded device state 192 (block 336). For example, the guest OS 196 may start using the backup device 171, which advantageously provides error recovery with minimum downtime when the backup device 171 is unchanged (e.g., primary device 160 and backup device 171 are the same). During the transition from the primary device 160 to the backup device 171, the hypervisor 180 may switch the pass-through device 174 from the primary device 160 to the backup device 171. For example, the pass-through device 174 may be re-used. In another example, a new pass-through device may be used with the backup device 171.

If the signature of the primary device mismatches the signature of the backup device, the guest OS may reinitialize the backup device (blocks 338 and 340). The state signature may mismatch between the primary device 160 and the backup device 171 if the devices have varying hardware and/or firmware versions. For example, the primary device 160 associated with the pass-through device 174 may be a PCI card with a firmware version of 10.1XA and the backup device 171 may be a PCI card with a firmware version of 10.1YA3, in which case the state signatures between the primary device 160 and the backup device 171 may not match. Additionally, the guest driver 188 may notify the guest OS 196 of the status of the state signature as mismatching. Then, the backup device 171 may be reinitialized (block 342). To account for this mismatch, the backup device 171 may be reinitialized to prevent the guest OS 196 from crashing and to ensure that the system runs properly. Once the backup device is reinitialized, the system may continue operation and the guest OS 196 may start using the backup device 171, which advantageously prevents the guest OS 196 from crashing and provides a full functionality system using the replaced hardware (e.g., backup device 171) that differs from the primary device 160.

Figure 4:
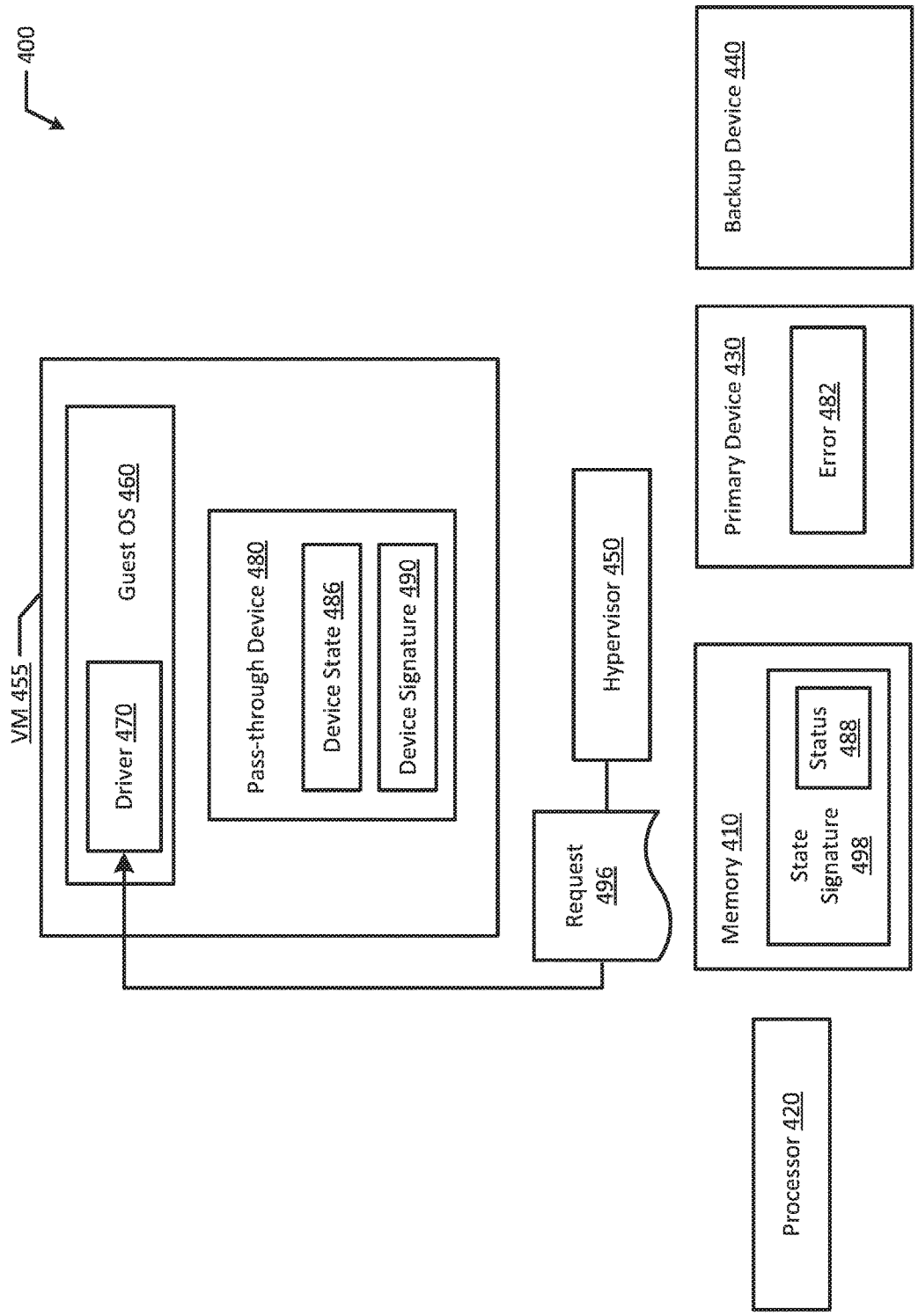
FIG. 4 illustrates a block diagram of an example error recovery system according to an example embodiment of the present disclosure.

FIG. 4 is a block diagram of an example device error recovery system 400 according to an example embodiment of the present disclosure. The error recovery system 400 may include a memory 410 and one or more physical processors (e.g., processor 420) in communication with the memory 410. The error recovery system 400 may include a primary device 430 and a backup device 440. The device error recovery system 400 may include a hypervisor 450 executing on the one or more physical processors (e.g., processor 420). The error recovery system 400 may further include a virtual machine 455. The virtual machine 455 may include a guest OS 460 executing on the hypervisor 450. The virtual machine 455 may also include a guest driver 470 in the guest OS 460 and a pass-through device 480. The hypervisor 450 may detect an error 482 associated with the primary device 430 and send a request 496 to save a device state 486 to the guest driver 470. The device state 486 may be associated with the primary device 430. The hypervisor 450 may also grant the guest OS 460 access to the backup device 440. The guest driver 470 in the guest OS 460 executing on the hypervisor 450 may receive the request 496 from the hypervisor 450. Responsive to receiving the request 496, the guest driver 470 may save a state signature 498 in memory 410. The state signature 498 may include a device signature 490 of the primary device 430 and a device state 486 of the primary device 430. The guest driver 470 may also determine a status 488 of the device signature 490 as one of matching the backup device 440 and mismatching the backup device 440.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
one or more physical processors in communication with the memory; and
a virtual machine including a guest operating system (OS) and a guest driver in the guest OS, wherein the guest OS is configured to:
receive a request to save a device state associated with a primary device,
save a state signature in the memory, wherein the state signature includes a device signature of the primary device and the device state of the primary device, and
determine a status of the device signature as one of matching a backup device and mismatching the backup device.

2. The system of claim 1, wherein the guest OS is configured to receive a restore notification to restore the device state into the backup device.

3. The system of claim 1, wherein responsive to determining the status of the device signature as matching the backup device, the guest OS is configured to load the device state to the backup device.

4. The system of claim 1, wherein responsive to determining the status of the device signature as mismatching the backup device, the guest OS is configured to reinitialize the backup device.

5. The system of claim 1, wherein the state signature includes information related to at least one of primary device memory, primary device storage, and network connectivity of the primary device.

6. The system of claim 1, wherein the device signature includes a unique identifier, the unique identifier including at least one of a random number, a token, and a text string.

7. The system of claim 1, wherein the guest OS is further configured to:
unload the guest driver in the guest OS from the memory; and
load a new guest driver in the guest OS in the memory.

8. The system of claim 1, wherein the guest OS is granted access to a second backup device, and wherein the guest OS is configured to determine a second status of the device signature as one of matching & the second backup device and mismatching the second backup device.

9. The system of claim 8, wherein responsive to determining the status of the device signature as mismatching the backup device and matching the second backup device, the guest OS is configured to load the device state to the second backup device.

10. The system of claim 1, wherein the device signature of the primary device includes at least one of a hardware device ID, a firmware device ID, a vendor ID, and a version.

11. The system of claim 1, wherein the device signature of the primary device includes at least one of a hash function, a list of loaded firmware, and a memory size.

12. A method comprising:
receiving, by a guest OS, a request to save a device state associated with a primary device;
saving, by the guest OS, a state signature in a memory, wherein the state signature includes a device signature of the primary device and the device state of the primary device; and
determining, by the guest OS, a status of the device signature as one of matching a backup device and mismatching the backup device.

13. The method of claim 12, further comprising:
receiving, by the guest OS, a restore notification to restore the device state into the backup device.

14. The method of claim 12, further comprising:
responsive to determining the status of the device signature as matching the backup device, loading, by the guest OS, the device state to the backup device.

15. The method of claim 12, further comprising:
responsive to determining the status of the device signature as mismatching the backup device, reinitializing, by the guest OS, the backup device.

16. The method of claim 12, further comprising:
unloading, by the guest OS, the guest driver in the guest OS from the memory; and
loading, by the guest OS, a new guest driver in the guest OS in the memory.

17. The method of claim 12, further comprising:
determining, by the guest OS, a second status of the device signature as one of matching a second backup device and mismatching the second backup device.

18. The method of claim 17, further comprising:
responsive to determining the status of the device signature as mismatching the backup device and matching the second backup device, loading, by the guest OS, the device state to the second backup device.

19. The method of claim 17, further comprising:
responsive to determining the status of the device signature as mismatching the backup device and matching the second backup device, loading, by the guest OS, the device state to the second backup device.

20. A non-transitory machine-readable medium storing a program, which when executed by a processor, is configured to cause a guest OS to:
receive a request to save a device state associated with a primary device;
save a state signature in a memory, wherein the state signature includes a device signature of the primary device and the device state of the primary device; and
determine a status of the device signature as one of matching a backup device and mismatching the backup device.

* * * * *

UNITED STATES PATENT AND TRADEMARK OFFICE
CERTIFICATE OF CORRECTION

PATENT NO. : 10,223,215 B2
APPLICATION NO. : 15/727879
DATED : March 5, 2019
INVENTOR(S) : Tsirkin et al.

Page 1 of 1

It is certified that error appears in the above-identified patent and that said Letters Patent is hereby corrected as shown below:

In the Claims

In Column 10, Line 58 (Claim 8), delete "&".

Signed and Sealed this
Twenty-first Day of May, 2019

Andrei Iancu
*Director of the United States Patent and Trademark Office*